(12) United States Patent
Panidepu et al.

(10) Patent No.: US 8,862,777 B2
(45) Date of Patent: Oct. 14, 2014

(54) SYSTEMS, APPARATUS, AND METHODS FOR MOBILE DEVICE DETECTION

(75) Inventors: Srinivasa Panidepu, Centreville, VA (US); Patricia Kelly, Herndon, VA (US); Neel Goyal, Reston, VA (US); Srinivas Sunkara, Ashburn, VA (US)

(73) Assignee: Verisign, Inc, Reston, VA (US)

( * ) Notice: Subject to any disclaimer, the term of this patent is extended or adjusted under 35 U.S.C. 154(b) by 697 days.

(21) Appl. No.: 13/078,680

(22) Filed: Apr. 1, 2011

(65) Prior Publication Data

US 2012/0254402 A1   Oct. 4, 2012

(51) Int. Cl.
| G06F 15/16 | (2006.01) |
| G06F 15/173 | (2006.01) |
| H04L 12/28 | (2006.01) |
| G06F 17/30 | (2006.01) |
| H04L 29/08 | (2006.01) |

(52) U.S. Cl.
CPC ........ *H04L 67/303* (2013.01); *G06F 17/30905* (2013.01); *H04L 67/02* (2013.01); *H04L 67/04* (2013.01)
USPC ............................ 709/245; 709/238; 370/351

(58) Field of Classification Search
USPC .................................... 709/238, 245; 370/351
See application file for complete search history.

(56) References Cited

U.S. PATENT DOCUMENTS

| 7,337,910 | B2 | 3/2008 | Cartmell et al. | |
| 8,526,405 | B2 * | 9/2013 | Curtis et al. | 370/338 |
| 2004/0215707 | A1 * | 10/2004 | Fujita et al. | 709/201 |
| 2006/0184638 | A1 | 8/2006 | Chua et al. | |
| 2007/0282899 | A1 | 12/2007 | Goodman et al. | |
| 2009/0082008 | A1 * | 3/2009 | Thorell | 455/423 |

FOREIGN PATENT DOCUMENTS

| WO | WO 02/27520 | 4/2002 |
| WO | WO 03/040893 | 5/2003 |
| WO | WO 2009/012461 | 1/2009 |
| WO | WO 2009/101414 | 8/2009 |

OTHER PUBLICATIONS

International Search Report and Written Opinion for Int'l Appln. No. PCT/US2012/028853, mailed Jul. 24, 2012 (11 pages).
Manoharan, Sathiamoorthy, "Dynamic Content Management and Delivery for Mobile Devices", International Conference on Mobile Ubiquitous Computing, Systems, Services and Technologies, 2007, pp. 63-67, University of Auckland, New Zealand (5 pages).

* cited by examiner

*Primary Examiner* — Ranodhi Serrao
(74) *Attorney, Agent, or Firm* — MH2 Technology Law Group, LLP

(57) ABSTRACT

Systems and methods are disclosed for detecting mobile devices. In one implementation, a system includes a web server. The web server receives mobile device detection strings from a DNS server in response to a DNS request and stores the mobile device detection strings on the server. The web server uses the mobile device detection strings to determine if a client device making a request to the web server is a mobile device. The web server may determine if the client device is a mobile device by comparing a user agent string in the request to the mobile device detection strings. The web server may determine whether the client device is a mobile device before sending the client device's request to any server-side scripts stored at the web server.

15 Claims, 6 Drawing Sheets

SYSTEMS, APPARATUS, AND METHODS FOR MOBILE DEVICE DETECTION

TECHNICAL FIELD

Disclosed embodiments relate generally to detecting device types of client devices making HTTP requests. More specifically, disclosed embodiments relate to determining whether a client making an HTTP request is a mobile device.

BACKGROUND

Devices used to surf the web come in all shapes and sizes. Because of the development of wireless and cellular networks, many people use mobile devices, e.g., cell phones, personal digital assistants (PDAs), smart phones, tablets, etc., to access websites over the Internet. However, the physical characteristics and technical capabilities may vary among mobile devices and between mobile devices and traditional computers, such as desktops or laptops. Because of these differences, a website that is meant to be displayed on a desktop or laptop may be difficult or impossible to view on a PDA or smart phone. Thus, some organizations offer mobile versions of their websites that are altered to display properly on a mobile device. For example, an organization with a website hosted at the domain name, "example.com," may also have a mobile version of the same website hosted at the domain name, "m.example.com." HTTP requests made to m.example.com may be served with simplified versions of web pages designed to render appropriately on mobile devices.

However, mobile device users may not know or bother to request mobile versions of websites by entering mobile-specific domain names on their mobile devices, but instead may enter more familiar, general website domain names. Thus, it may be beneficial for owners of websites to be able to automatically detect when a user is making a request from a mobile device in order to automatically provide the user with a mobile version of the website.

One way of determining whether a user is accessing a website using a mobile device is by examining a user agent string. Specifically, when a client makes an HTTP request, the HTTP request may include a "User-Agent" field as an HTTP header. The User-Agent field may identify, for example, the type of device and/or browser that the client is using. Then, one or more server-side scripts to which the HTTP request object is passed from the web server application may compare the User-Agent field to a list of user agent strings typically associated with mobile devices to determine if the device is a mobile device. For example, databases such as the Wireless Universal Resource File (WURFL) contain listings of user agent strings associated with various devices, as well as the capabilities of such devices. Server-side scripts may make use of such databases to determine whether a given HTTP request originates from a mobile device by comparing the User-Agent field of the HTTP request with one or more user agent strings of the database. However, in order to ensure comprehensiveness across all or nearly all known devices, such databases may be enormous, making the comparison resource-intensive for server-side scripts. Moreover, it may be necessary to continually update such databases to ensure that they account for all mobile devices, as new user agent strings or mobile devices arise.

Traditionally, server-side scripts perform any mobile device detection. When a web server hosting a website receives an HTTP request, the web server application handles basic HTTP operations, constructs an HTTP request object, and then forwards the HTTP request object to any server-side scripts responsible for dynamically rendering the web pages on the website. It is these server-side scripts that typically are responsible for comparing the User-Agent field of the HTTP request to the entries in the WURFL or other database. Thus, the HTTP request must undergo significant processing before it is even known whether the client is a mobile device. Therefore, there is a need for systems and methods of enabling a web server to quickly determine whether an HTTP request originates from a mobile device before the HTTP request undergoes significant processing or forwarding to any server-side scripts. There is also a need for systems and methods of mobile device detection that obviate the need to search through large user agent string databases to determine whether an HTTP request originates from a mobile device and that enable may be easily and frequently updated to account for new devices or user agent strings without significant processing or memory overhead.

SUMMARY

Systems and methods consistent with disclosed embodiments include a web server may send a DNS request to a DNS server for one or more mobile device detection strings. The web server may receive a DNS response from the DNS server that includes one or more mobile device detection strings and may store the mobile device detection strings into memory. The web server may also receive an HTTP request from a client device, and may determine whether the client device is a mobile device by comparing a characteristic of the client device to one or more of the mobile device detection strings.

According to some embodiments, the web server may compare a User-Agent header in the HTTP request the mobile device detection strings to determine whether the client device is a mobile device. The mobile device detection strings may include regular expressions and/or User Agent strings from a database such as the WURFL.

According to other embodiments, the web server may execute one or more modules in a web server application processing the HTTP request to determine whether the client is a mobile device before the HTTP request is forwarded to any server-side scripts.

If the web server determines that the client device is a mobile device, the web server may send an HTTP response to the client device instructing a browser of the client device to make a new HTTP request to a URL corresponding to a mobile version of the resource requested by the client, according to some embodiments. According to other embodiments, the web server may modify the HTTP request received from the client device to include header information indicating that the client device is a mobile device and forward the modified HTTP request to server-side scripts associated with servicing the requested resource. The web server may also modify the HTTP request to add information about the device, e.g., screen dimensions, browser type and capabilities, display capabilities, etc. In some of these embodiments, the web server may set an HTTP cookie on the client device to indicate that the client device is a mobile device.

Additional objects and advantages of disclosed embodiments will be set forth in part in the description that follows, and in part will be obvious from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments of the invention and together with the description, serve to explain the principles of the disclosed embodiments. In the drawings.

DETAILED DESCRIPTION OF THE EMBODIMENTS

Reference will now be made in detail to exemplary disclosed embodiments, examples of which are illustrated in the accompanying drawings. Wherever possible, the same reference numbers will be used throughout the drawings to refer to the same or like parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
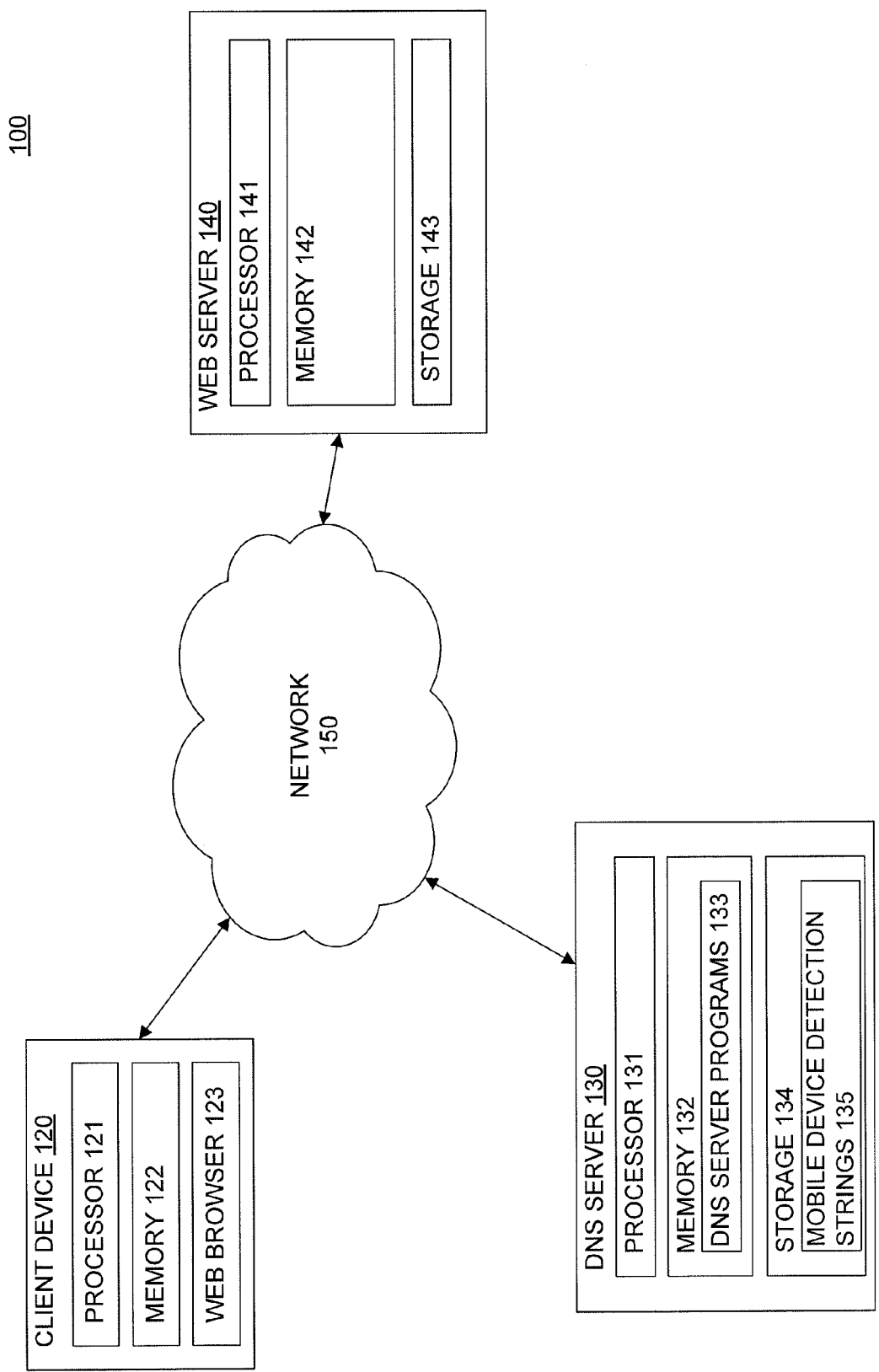
FIG. 1 is a diagram illustrating an exemplary mobile device detection system that may be used to implement certain disclosed embodiments.

FIG. 1 is a diagram illustrating an exemplary mobile device detection system 100 that may be used to implement disclosed embodiments, including exemplary system components. For example, system 100 may include client device 120, DNS (Domain Name System) server 130, and web server 140 communicatively connected via network 150. However, the components, the number of components, and their arrangement may be varied.

Client device 120 may be any type of device capable of sending HTTP requests via a network. For example, client device 120 may be a personal computer, such as a laptop or desktop, or may also be a mobile device, such as a cell phone, PDA, smart phone, tablet, etc. Client device 120 may include a processor 121, a memory 122, and a web browser 123 to communicate with DNS server 130 and/or web server 140 via network 150. Client device 120 may include I/O devices (not shown) to enable communication with a user. For example, the I/O devices may include one or more input devices, such as a keyboard, keypad, touch screen, mouse, and the like, that enable client device 120 to receive data from a user, such as web addresses (URLs) for websites that the user would like to view. Further, client device 120 may include I/O devices (not shown) that communicate with one or more output devices, such as a display screen, CRT monitor, LCD monitor, plasma display, printer, speaker devices, and the like, that enable client device 120 to present data to a user. Client device 120 may also include I/O devices (not shown) for communicating with other devices—e.g., via network 150—such as a network interface controller or wireless communications componentry.

DNS server 130 may include a processor 131, a memory 132, and a storage 134. Processor 131 may include one or more processing devices, such as a microprocessor from the Pentium™ or Xeon™ family manufactured by Intel™, the Turion™ family manufactured by AMD™, or any other type of processor. Memory 132 may include one or more storage devices configured to store information used by processor 131 to perform certain functions related to disclosed embodiments. For example, memory 132 may store one or more DNS server programs 133 loaded from storage 134 or elsewhere that, when executed, enable DNS server 130 to receive and respond to DNS requests from client or server devices. Storage 134 may include a volatile or non-volatile, magnetic, semiconductor, tape, optical, removable, nonremovable, or other type of storage device or computer-readable medium. Storage 134 may store one or more mobile device detection strings 135 that may be used by a web server, such as web server 140, to determine whether a client device making an HTTP request to the web server is a mobile device.

DNS server programs 133 may enable DNS server 130 to receive requests from clients and web servers for DNS records, such as IP addresses associated with one or more domain names. In one embodiment, DNS server programs 133 may also enable DNS server 130 to receive a request from a web server, such as web server 140, for mobile device detection strings 135 stored in storage 121. In response to the request, DNS server programs 133 may cause DNS server 130 to send a DNS response message to the web server 140, including mobile device detection strings 135. The DNS response message may be sent in the form of a DNS text record (DNS resource record type: TXT), as defined by RFC 1035, for example.

Web server 140 may include a processor 141, a memory 142, and a storage 143. Processor 141 may include one or more processing devices, such as a microprocessor from the Pentium™ or Xeon™ family manufactured by Intel™, the Turion™ family manufactured by AMD™, or any other type of processor. Memory 142 may include one or more storage devices configured to store information used by processor 141 to perform certain functions related to disclosed embodiments. Storage 143 may be a volatile or non-volatile, magnetic, semiconductor, tape, optical, removable, nonremovable, or other type of storage device or computer-readable medium and may contain data used to display individual web pages. Web server 140 will be described in greater detail below with regard to FIG. 3.

Client device 120 may communicate with one or more DNS servers, such as DNS server 130, via network 150 to resolve IP addresses corresponding to various domain names or URLs requested by browser 123. For example, a user at client device 120 may enter "example.com" into an address box in browser 123. Client device 120 may send DNS queries to one or more DNS servers, such as DNS server 130, to request the IP address assigned to example.com. In response to the DNS request, DNS server 130 may send a DNS response to client device 120 that includes the IP address corresponding to example.com.

If example.com is being hosted on web server 140, client device 120 may send an HTTP request to web server 140 using the IP address resolved by the DNS query. In response to the HTTP request, web server 140 may send data used to display a web page to client device 120, such as textual data in the form of HyperText Markup Language ("HTML"). In some embodiments, web server 140 may determine whether client device 120 is a mobile device based on the HTTP request. For example, web server 140 may analyze the User-Agent header of the HTTP request to determine whether client device 120 is a mobile device. Web server 140 may then determine whether it has a mobile version of the web page being requested by client device 120. If a mobile version exists, web server 140 may process the HTTP request differently based on this determination. The processes of detecting a mobile device and processing the HTTP request are discussed in greater detail below.

Web server 140 may also communicate with DNS server 130 via network 150. For example, web server 140 may send a request to DNS server 130. The request may include a request for one or more mobile device detection strings 135 that are stored on or accessible to DNS server 130. In response to the request, DNS server 130 may send one or more mobile device detection strings 135 to web server 140. In some embodiments, web server 140 may make a request to DNS server 130 in the form of a DNS request, and DNS server 130 may respond in the form of a DNS response message, such as in a DNS text record. Web server 140 may store one or more of mobile device detection strings 135 and may use such strings to determine whether a client device making an HTTP request is a mobile device. For example, web server 140 may compare the User-Agent header of an HTTP request from client device 120 to mobile device detection strings 135 to determine whether client device 120 is a mobile device.

In some embodiments, the mobile device detection strings 135 stored in DNS server 130 may be updated as new devices come to market, as device capabilities change, etc. In certain embodiments, DNS server 130 may automatically generate DNS text record messages and send them to web server 140 so that web server 140 can update the mobile device detection strings. In other embodiments, web server 140 may send a request for the updated mobile device detection strings 135 at various times, e.g., after receiving notice that mobile device detection strings 135 have been updated, at specified time intervals such as every day, week, month, etc.

Those skilled in the art will appreciate that client device 120 need not resolve the requested IP address through the same DNS server 130 that provides web server 140 with mobile device detection strings 135.

Figure 2:
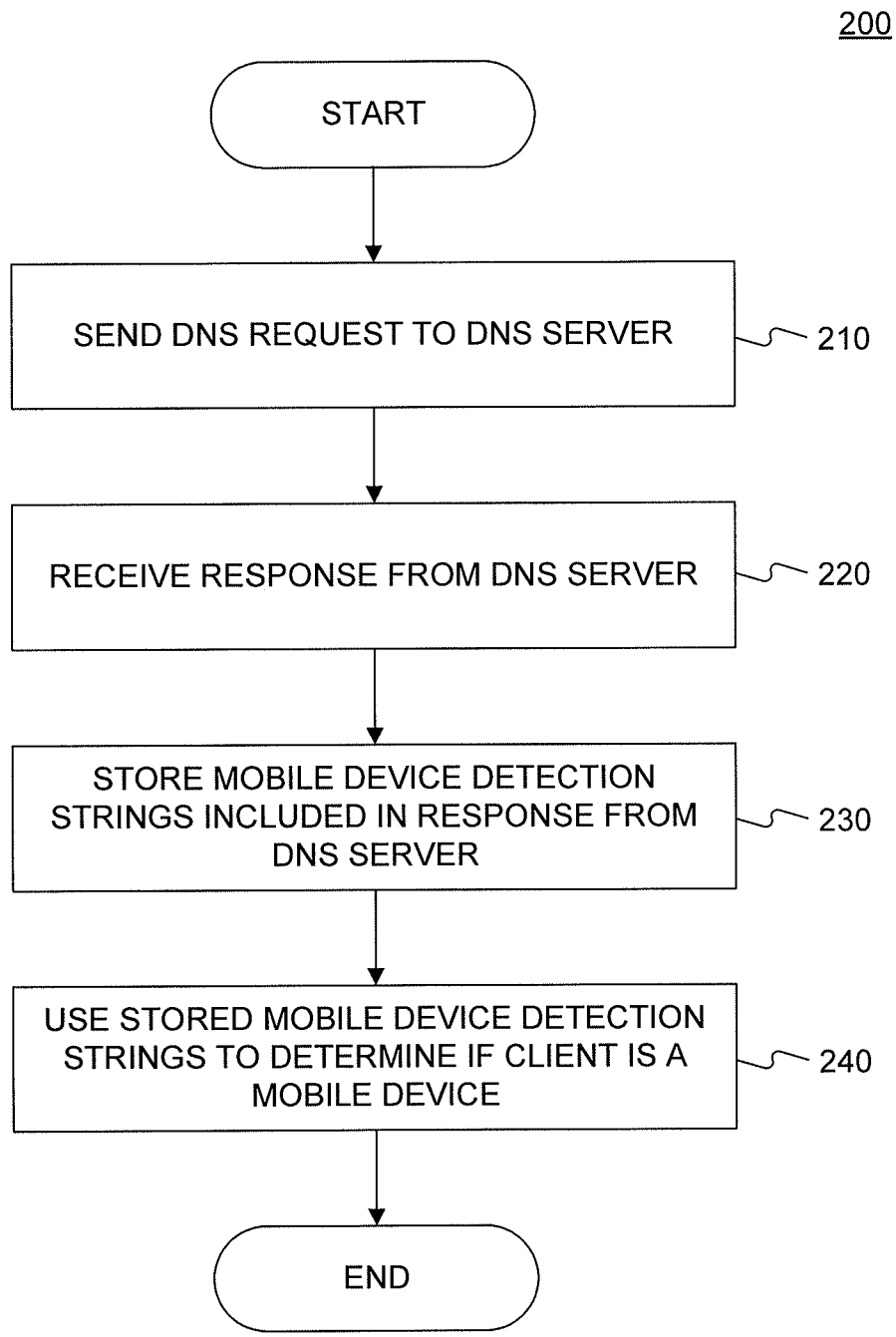
FIG. 2 is a flow diagram illustrating an exemplary process performed by a web server, consistent with certain disclosed embodiments.

FIG. 2 is a flow diagram illustrating an exemplary process 200 performed by web server 140, consistent with certain disclosed embodiments. In particular, FIG. 2 depicts a process, from a high-level view, by which web server 140 may interact with DNS server 130 to receive and store mobile device detection strings 135, which may be used to determine whether client device 120 is a mobile device. In certain embodiments, process 200 may be performed by one or more programs loaded into memory 142.

In step 210, web server 140 may send a DNS request to a DNS server. The DNS request sent by web server 140 may be for DNS text records, including mobile device detection strings stored in the DNS server. One or more programs loaded into memory 142 may include a domain address for the DNS text records. Web server 140 may send the DNS request to the DNS server corresponding to the domain address provided by the program. For example, if DNS server 130 is storing mobile device detection strings 135, the domain address may correspond to DNS server 130.

In step 220, web server 140 may receive a DNS response from the DNS server. The DNS response received by web server 140 may include DNS text records that include one or more mobile device detection strings 135 stored in the DNS server.

In step 230, web server 140 may store the mobile device detection strings that were included in the DNS response received from the DNS server in step 220. For example, web server 140 may store the mobile device detection strings in storage 143 and/or memory 142.

In step 240, web server 140 may use one or more of the stored mobile device detection strings to determine if a client device making an HTTP request to web server 140 is a mobile device. In some embodiments, web server 140 may compare the User-Agent header of the HTTP request to one or more of the stored mobile device detection strings to determine whether the requesting client device is a mobile device. This step will be described in greater detail below.

Figure 3:
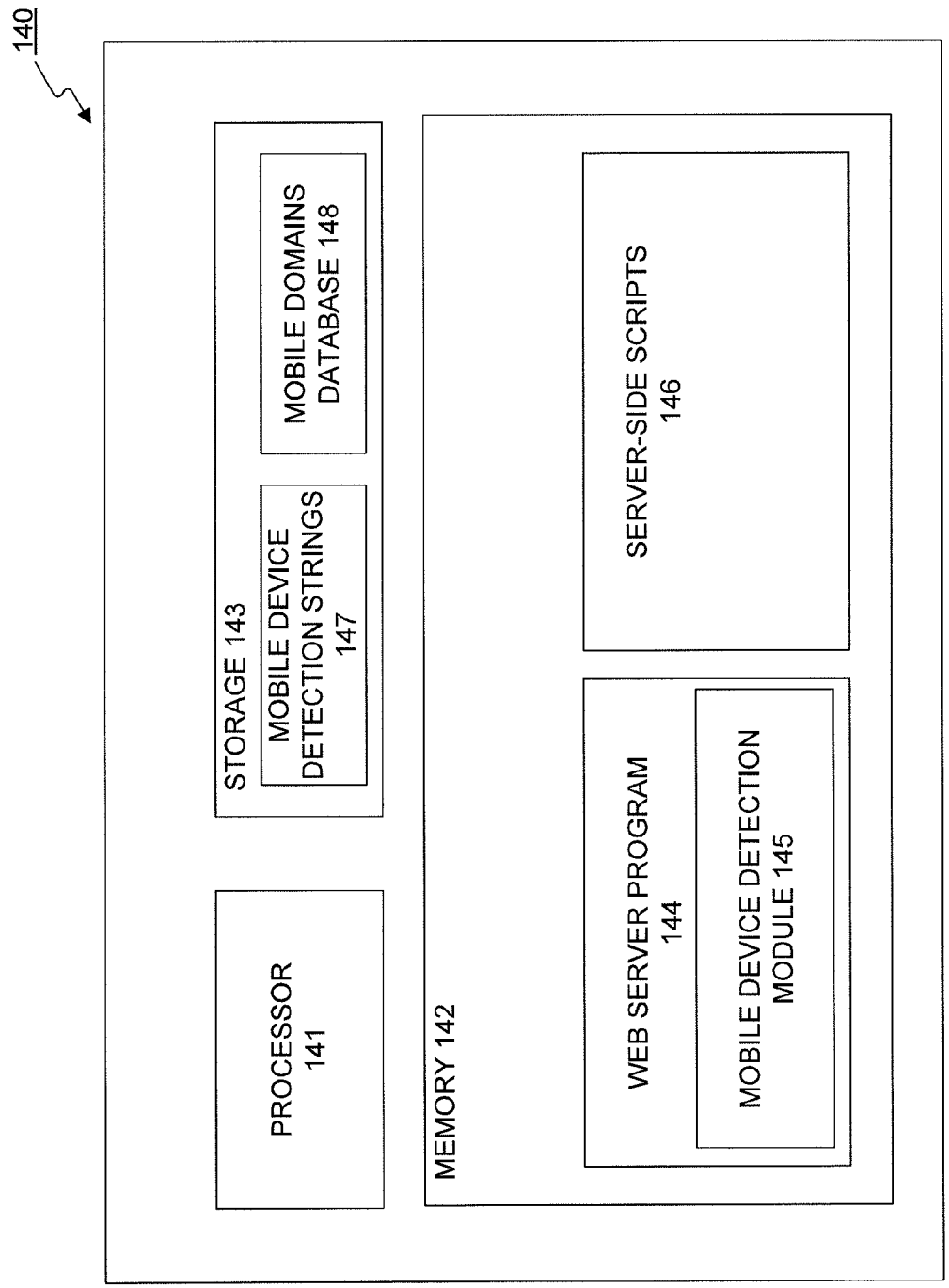
FIG. 3 is a diagram illustrating an exemplary web server, consistent with certain disclosed embodiments.

FIG. 3 is a diagram illustrating an exemplary web server 140, consistent with certain disclosed embodiments. As discussed above with regard to FIG. 1, web server 140 may include processor 141, memory 142, and storage 143. In some embodiments, storage 143 may store data used to display web pages. For example, storage 143 may store web page content (not shown) such as text, images, videos, etc. Storage 143 may also store data related to mobile device detection that may be accessed by one or more programs loaded into memory 142. For example, storage 143 may store mobile device detection strings 147. In some embodiments, mobile device detection strings 147 may include some or all of the mobile device detection strings 135 received from a DNS server in response to a DNS request. Mobile device detection strings 147 may include or be derived from one or more User Agent strings from a database such as the Wireless Universal Resource File (WURFL). In certain embodiments, mobile device detection strings 147 may include regular expressions that can be compared to the client device's User-Agent header to determine if the client device is a mobile device. In other embodiments, mobile device detection strings 147 may include one or more User Agent strings from a database such as the WURFL.

Storage 143 may also maintain mobile domains database 148 of web pages that are hosted by web server 140 as well as an indication of which of the web pages include a corresponding mobile version of the web page. Mobile device detection module 145, discussed in greater detail below, may access mobile domains database 148 to determine if a hosted web page has a corresponding mobile version. Mobile domains database 148 may be modified as capabilities of the hosted web pages change. For example, an administrator of web server 140 may modify mobile domains database 148 to indicate that a hosted web page, "example.com," which previously did not have a mobile version, now has a mobile version, "m.example.com." In some embodiments, the web page owner may be able to modify mobile domains database 148 for the web page that the owner owns.

Memory 142 may include one or more programs loaded from storage 143 or elsewhere that, when executed, perform various procedures, operations, or processes consistent with disclosed embodiments. Memory 142 may include a web server program 144 that enables web server 140 to receive and service HTTP requests for web pages of the websites that it hosts. For example, web server program 144 may be a web server application such as Apache or Microsoft IIS.

Web server program 144 may include a mobile device detection module 145 that enables web server program 144 to determine if a client device making an HTTP request to web server 140 is a mobile device. For example, the Apache HTTP server software provides several "hooks" that allow custom-written programs to intercept and modify an HTTP message, as it is processed by the main HTTP server program, using the "mod_perl" library. Mobile device detection module 145 may be a custom-written Apache module that analyzes information in an HTTP request, between two or more phases of the Apache HTTP request-handling sequence, to determine if the client device is a mobile device. This technique allows web server program 144 to determine whether an HTTP request originates from a mobile device early within the request-handling process, before the request object is fully formed or the HTTP environment is populated and before the request object is passed to any server-side scripts or other programs external to web server program 144.

In some embodiments, mobile device detection module 145 may compare the requested domain in the HTTP request to mobile domains database 148 to determine if the requested domain has a corresponding mobile version. If the requested domain does have a mobile version, mobile device detection module 145 may compare a User-Agent header of the HTTP request to one or more mobile device detection strings 147 storage 143 to determine whether the client device is a mobile device. If the User-Agent header matches one or more of mobile device detection strings 147, mobile device detection module 145 may determine that the client device making the HTTP request is a mobile device. As a result of this detection, mobile device detection module 145 may instruct web server program 144 to take certain actions. For example, web server program 144 may send an HTTP redirect response to the client device, instructing the client device to make a subsequent HTTP request for the mobile version of the web page. Alternatively, web server program 144 may construct or modify the HTTP request object that it passes to any server-side scripts to indicate that the client device is a mobile device.

Memory 142 may also include one or more server-side scripts 146 that may interact with web server program 144 and/or mobile device detection module 145 to generate web pages being hosted by web server 140. For example, web server program 144 may process and forward the HTTP requests received at web server 140 to the appropriate server-side script 146 associated with the requested URL or domain. As discussed above, if mobile device detection module 145 determines that the client device making an HTTP request to web server 140 is a mobile device, it may direct web server program 144 to issue an HTTP redirect, such as 301 Redirect, or may construct or modify an HTTP header in the HTTP request object to inform server-side scripts 146 that the client device is a mobile device.

In particular, web server program 144 may send an HTTP redirect to the client device that instructs the client to make a second HTTP request to a URL associated with a mobile version of the webpage originally requested by the client. The URL associated with the mobile version of the webpage originally requested by the client may be served by one or more server-side scripts 146, or may be a simple static HTML page. In any event, all clients who make HTTP requests to the mobile version URL may be served mobile versions of webpages without the need for any analysis by server-side scripts as to whether particular clients are mobile devices.

In other embodiments, web server program 144 may construct or modify an HTTP header of the HTTP request object to indicate that the client device is a mobile device, and the modified HTTP request may be sent to one or more server-side scripts 146 for serving the originally requested website. In this case, the server-side scripts 146 will be able to recognize, without analysis of the User-Agent header, that the client device is a mobile device based on the modified HTTP header and process the request accordingly.

In some embodiments, a server-side script 146 may specifically format the web page for a mobile device. In other embodiments, the server-side script may forward the request to another server-side script associated with the mobile version of the web page. In either of these embodiments, however, the server-side script does not need to perform any analysis of the User-Agent header to determine if the device is mobile, because it has already been performed before the HTTP request was forwarded to the server-side script.

Figure 4:
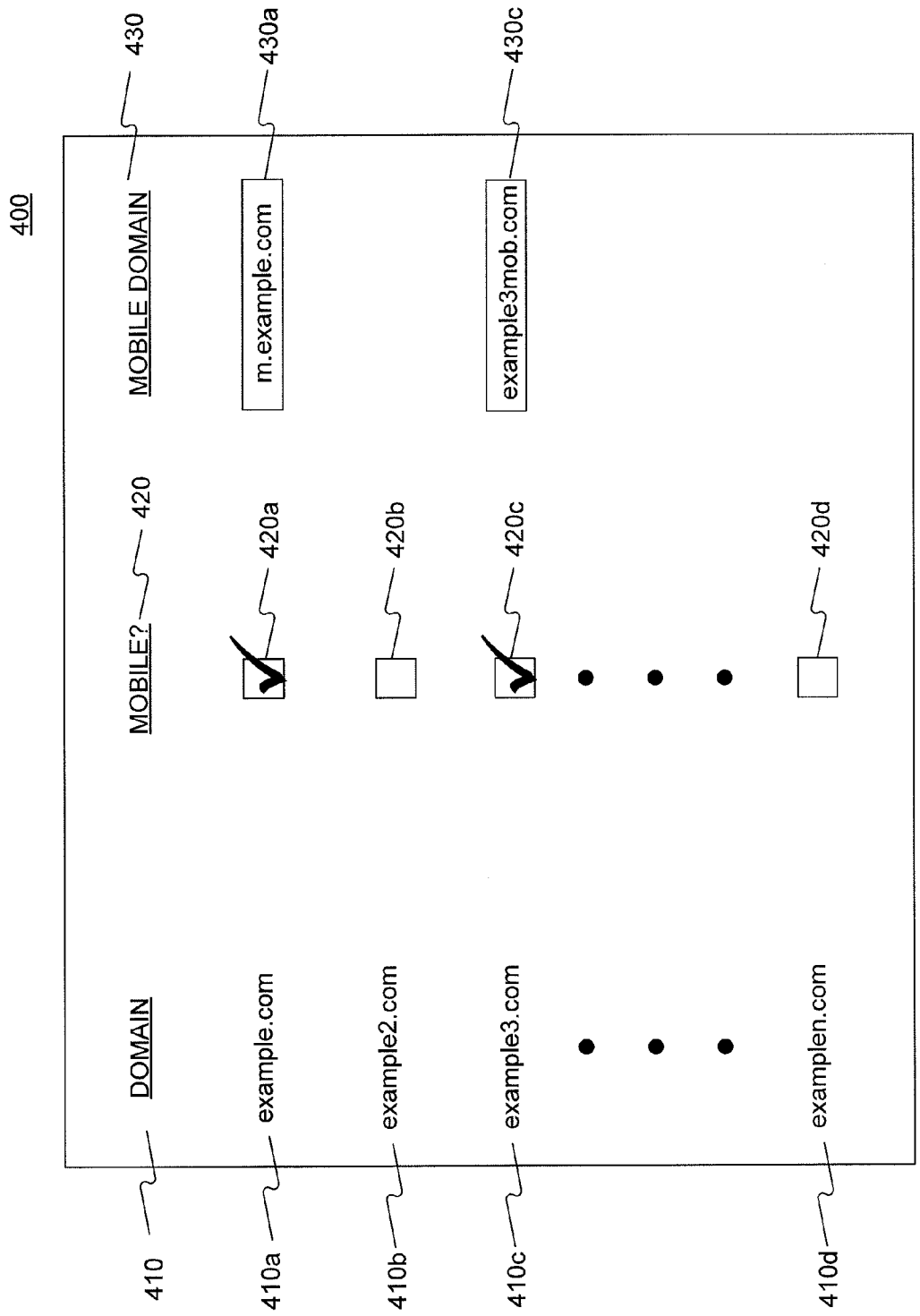
FIG. 4 is an exemplary interface for modifying a mobile domain database, consistent with certain disclosed embodiments.

FIG. 4 is an exemplary interface 400 for modifying mobile domains database 148, consistent with certain disclosed embodiments. An administrator of web server 140 may interact with interface 400 to indicate which web pages, websites, or domains hosted by web server 140 have corresponding mobile versions. Similarly, an owner of web pages hosted on web server 140 may also interact with interface 400 to indicate which of the web pages owned by the owner have corresponding mobile versions.

Exemplary interface 400 includes a listing of domains 410, mobile indicators 420, and mobile domain fields 430 for each domain. In embodiments where the administrator of web server 140 interacts with interface 400, domains 410 may include all of the domains hosted by web server 140. Similarly, in embodiments where the owner of web pages hosted on web server 140 interacts with interface 400, domains 410 may include all of the domains owned by the owner.

If one of domains 410, such as domain 410a, "example.com," has a corresponding mobile version, the administrator may select mobile indicator 420a corresponding to domain 410a. The administrator may also enter a mobile domain address 430a, "m.example.com," as the mobile domain address corresponding to domain 410a. Mobile device detection module 145 may update mobile domains database 148 according to entries made in interface 400. For example, mobile device detection module 145 may update mobile domains database 148 to indicate that domains 410a and 410c have corresponding mobile domains 430a and 430c, respectively, while domains 410b and 410d do not have corresponding mobile domains.

Figure 5:
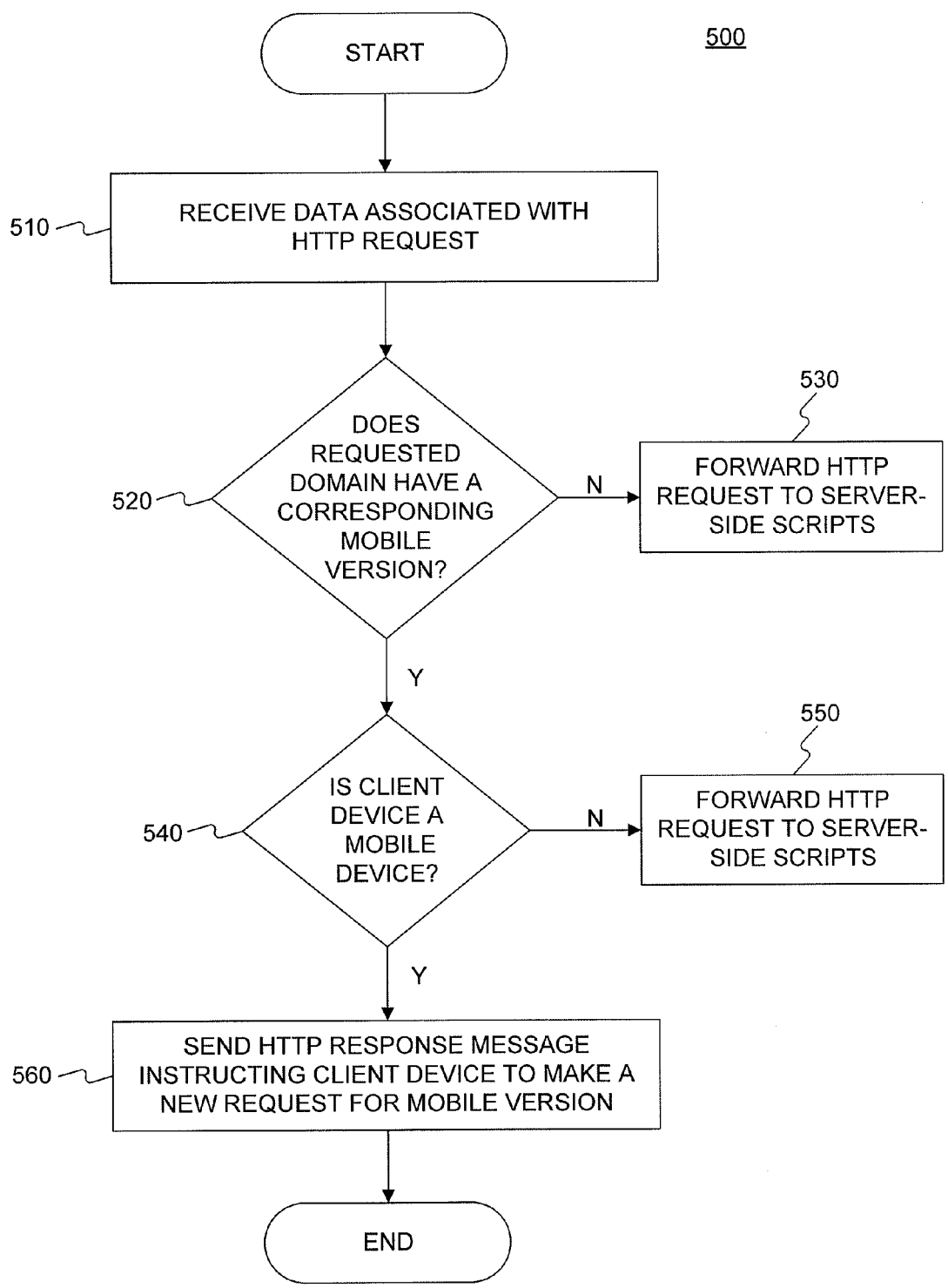
FIG. 5 is a flow diagram of a process for detecting mobile devices, consistent with certain disclosed embodiments.

FIG. 5 is a flow diagram of a process 500 for detecting mobile devices, consistent with certain disclosed embodiments. Web server 140 may execute process 500, for example, when a client device sends an HTTP request to web server 140. At step 510, web server 140 may receive data associated with an HTTP request. For example, a client device may send an HTTP request to web server 140 for a web page hosted on web server 140. Web server 140 may receive data associated with the request, such as via the Transmission Control Protocol (TCP). In some embodiments, web server 140 may parse the raw TCP data into an HTTP request.

At step 520, web server 140 determines whether the requested domain has a corresponding mobile version. For example, web server 140 may compare the requested domain in the HTTP request to the domains listed in mobile domains database 148 to determine whether the requested domain has a corresponding mobile version. If, at step 520, web server 140 determines that the requested domain does not have a corresponding mobile version (step 520, N), then in step 530 web server 140 forwards the HTTP request to one or more server-side scripts 146 to allow the HTTP request to be processed by the server-side scripts for the non-mobile version of the website.

If, at step 520, web server 140 determines that the requested domain does have a corresponding mobile version (step 520, Y), then in step 540 web server 140 determines whether the client device that made the HTTP request is a mobile device. For example, web server 140 may compare a User-Agent header of the HTTP request sent by the client device to one or more mobile device detection strings 147 stored in storage 143. If the User-Agent header matches one or more of mobile device detection strings 147, web server 140 may determine that the client device that sent the HTTP request is a mobile device. On the other hand, if the User-Agent header does not match one or more of mobile device detection strings 146, web server 140 may determine that the client device is not a mobile device. If web server 140 determines that the client device is not a mobile device (step 540, N), then at step 550 web server 140 forwards the HTTP request to server-side scripts 146 to allow the HTTP request to be processed by the server-side scripts for the non-mobile version of the website.

If, at step 540, web server 140 determines that the client device is a mobile device (step 540, Y), then, at step 560, web server 140 sends an HTTP response message to the client device instructing a browser of the client device to make a new request for a mobile version of the requested domain. For example, web server 140 may issue an HTTP 301 or 302 redirect to redirect the browser 123 of client device 120 to a mobile version of the requested domain. In some embodiments, the redirect URL may also be hashed to encapsulate additional information about the mobile device, e.g. display capabilities, browser version, etc. Further, in certain embodiments, web server 140 may also set an HTTP cookie on the client device that indicates the client is a mobile device. By setting a cookie on the client device, for all future requests from that client device, the cookie may indicate to web server 140 that the client is a mobile device, thus obviating the need for either the web server or any server-side scripts to analyze the client's HTTP request to determine whether the client is a mobile device.

Figure 6:
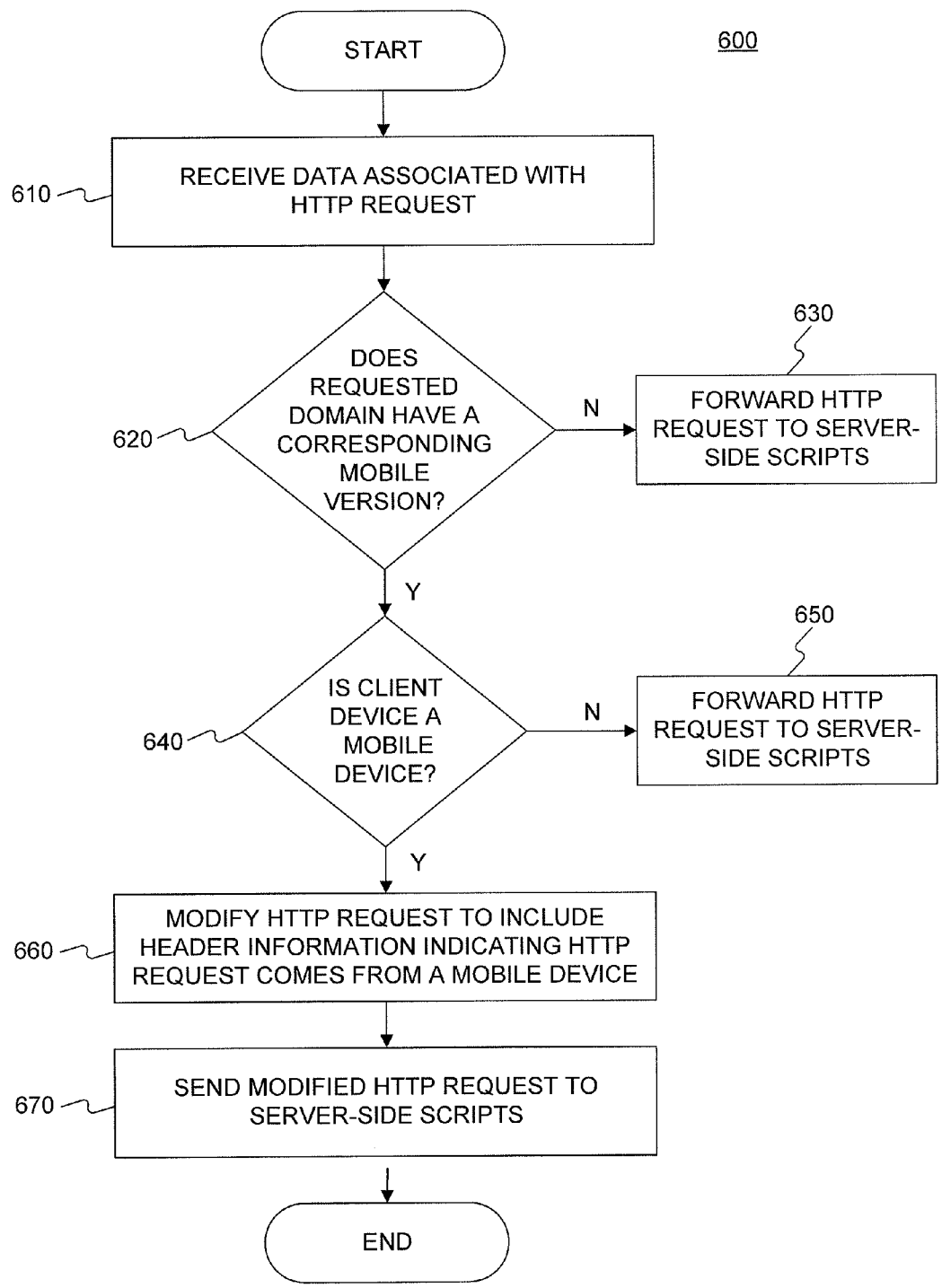
FIG. 6 is a flow diagram of a process for detecting mobile devices, consistent with certain disclosed embodiments.

FIG. 6 is a flow diagram of a process 600 for detecting mobile devices, consistent with certain disclosed embodiments. Web server 140 may execute process 600, for example, when a client device sends an HTTP request to web server 140. At step 610, web server 140 may receive data related to an HTTP request. For example, a client device may send an HTTP request to web server 140 for a web page hosted on web server 140. Web server 140 may receive data associated with the request, such as via TCP, and web server 140 may parse the raw TCP data into an HTTP request.

At step 620, web server 140 determines whether the requested domain has a corresponding mobile version. For example, web server 140 may compare the requested domain in the HTTP request to the domains listed in mobile domains database 148 to determine whether the requested domain has a corresponding mobile version. If, at step 620, web server 140 determines that the requested domain does not have a corresponding mobile version (step 620, N), then in step 630 web server 140 forwards the HTTP request to one or more server-side scripts 146 to allow the HTTP request to be processed by the server-side scripts for the non-mobile version of the website.

If, at step 620, web server 140 determines that the requested domain does have a corresponding mobile version (step 620, Y), then in step 640 web server 140 determines whether the client device that made the HTTP request is a mobile device. For example, web server 140 may compare a User-Agent header of the HTTP request sent by the client device to one or more mobile device detection strings 147 stored in storage 143. If the User-Agent header matches one or more of mobile device detection strings 147, web server 140 may determine that the client device that sent the HTTP request is a mobile device. On the other hand, if the User-Agent header does not match one or more of mobile device detection strings 147, web server 140 may determine that the client device is not a mobile device. If web server 140 determines that the client device is not a mobile device (step 640, N), then at step 650 web server 140 forwards the HTTP request to server-side scripts 146 to allow the HTTP request to be processed by the server-side scripts for the non-mobile version of the website.

If, at step 640, web server 140 determines that the client device is a mobile device (step 640, Y), then at step 660 web server 140 modifies the HTTP request received from the client device to include HTTP header information indicating that the HTTP request is from a mobile device. Then, at step 670, web server 140 sends the modified HTTP request to server-side scripts 146. In this manner, any server-side scripts 146 will be able to immediately recognize that the client device is a mobile device based on the modified HTTP header and process the request accordingly. In certain embodiments, web server 140 may also set an HTTP cookie on the client device that indicates the client is a mobile device. Thus, for all future requests from that client, the cookie will indicate to web server 140 and/or server-side scripts 146 that the client is a mobile device, without the need for additional analysis.

In another embodiment, rather than the web server retrieving mobile device detection strings from a DNS or other server only initially or periodically, the web server may consult the DNS server for any individual client HTTP request that is made to the web server. That is, when a given client HTTP request is received at the web server, the web server may send a separate request (HTTP, DNS, or otherwise) to the DNS server, which request may include user agent or other information resident in the client HTTP request, for an indication as to whether the client HTTP request was made by a mobile device. The DNS server, upon receiving the request from the web server, may use the client information forwarded by the web server to search an internal database, such as a WURFL database, to determine whether the client is a mobile device, and may send back to the web server an indication of whether the client is a mobile device (including potentially further details about the nature of the mobile device, such as its screen dimensions, browser type and capabilities, display capabilities, etc.). This approach may not only enable the web server to avoid having to store any kind of mobile detection string file or database in memory, but also may enable the web server to determine whether the client is a mobile device based on the most recent user agent information available, rather than only the information that comprised the last periodic update received by the web server from the DNS server.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage devices, such as secondary storage devices, like hard disks, floppy disks, a CD-ROM, USB media, DVD, or other forms of RAM or ROM.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering, combining, separating, inserting, and/or deleting steps. It is intended, therefore, that the specification and examples be considered as exemplary only, with a true scope and spirit being indicated by the following claims and their full scope equivalents.

What is claimed is:

1. A computer-implemented method of detecting mobile devices performed by a web server, the method comprising:
sending a domain name service (DNS) request to a DNS server for one or more mobile device detection strings;
receiving a DNS response from the DNS server in response to the DNS request, the DNS response including the one or more mobile device detection strings;
storing the mobile device detection strings included in the DNS response into memory;
receiving a hyper text transfer protocol (HTTP) request from a client device for a resource specified, at least in part, by a domain name;
determining, before initiating any associated script to process the HTTP request, whether the client device is a mobile device by comparing a characteristic of the client device to one or more of the mobile device detection strings received from the DNS server, wherein determining whether the client device is a mobile device comprises:
 comparing a User-Agent header in the HTTP request to one or more of the mobile device detection strings,
 determining that the client device is a mobile device if the User-Agent header matches one or more of the mobile device detection strings, and
 executing one or more modules in a web server application processing the HTTP request to determine whether the client is a mobile device before the HTTP request is forwarded to any server-side scripts;
modifying the HTTP request received from the client device to include header information indicating that client is a mobile device; and
forwarding the modified HTTP request to server-side scripts associated with servicing the resource.

2. A computer-implemented method of detecting mobile devices performed by a web server, the method comprising:
sending a domain name service (DNS) request to a DNS server for one or more mobile device detection strings, wherein the mobile device detection strings are regular expression strings;
receiving a DNS response from the DNS server in response to the DNS request, the DNS response including the one or more mobile device detection strings;
storing the mobile device detection strings included in the DNS response into memory;
receiving a hyper text transfer protocol (HTTP) request from a client device for a resource specified, at least in part, by a domain name; and
determining whether the client device is a mobile device by comparing a characteristic of the client device to one or more of the mobile device detection strings received from the DNS server, wherein determining whether the client device is a mobile device comprises—
 comparing a User-Agent header in the HTTP request to one or more of the mobile device detection strings,
 determining that the client device is a mobile device if the User-Agent header matches one or more of the mobile device detection strings, and
 executing one or more modules in a web server application processing the HTTP request to determine whether the client is a mobile device before the HTTP request is forwarded to any server-side scripts.

3. The method of claim 2, wherein the mobile device detection strings are User Agent strings.

4. The method of claim 2, further comprising:
sending an HTTP response to the client device instructing a browser of the client device to make a new HTTP request to a URL corresponding to a mobile version of the resource requested by the client.

5. The method of claim 4, further comprising:
setting an HTTP cookie on the client device to indicate that the client device is a mobile device.

6. The method of claim 2, further comprising:
modifying the HTTP request received from the client device to include header information indicating that the client device is a mobile device; and
forwarding the modified HTTP request to server-side scripts associated with servicing the requested resource.

7. The method claim 6, further comprising:
setting an HTTP cookie on the client device to indicate that the client device is a mobile device.

8. The method of claim 2, further comprising:
modifying the HTTP request received from the client device to include header information describing one or more capabilities of the client device; and
forwarding the modified HTTP request to server-side scripts associated with servicing the requested resource.

9. The method of claim 8, further comprising:
setting an HTTP cookie on the client device describing the capabilities of the client device.

10. A web server configured to determine whether a client device is a mobile device, the web server comprising:
a processing system comprising one or more processors; and
a memory storing one or more server-side scripts corresponding to one or more web pages hosted on the web server and storing a mobile device detection program including instructions to direct the processing system to perform operations comprising:
 sending a domain name service (DNS) request to a DNS server for one or more mobile device detection strings;
 receiving a DNS response from the DNS server in response to the DNS request, the DNS response including one or more mobile device detection strings,
wherein the mobile device detection strings are regular expression strings;
 storing the mobile device detection strings included in the DNS response into memory;
 receiving a hyper text transfer protocol (HTTP) request from a client device for a resource specified, at least in part, by a domain name; and
 determining, before initiating any associated script to process the HTTP request, whether the client device is a mobile device by comparing a characteristic of the client device to one or more of the mobile device detection strings received from the DNS server, wherein determining whether the client device is a mobile device comprises:
  comparing a User-Agent header in the HTTP request to one or more of the mobile device detection strings;

determining that the client device is a mobile device if the User-Agent header matches one or more of the mobile device detection strings; and executing one or more modules in a web server application processing the HTTP request to determine whether the client is a mobile device before the HTTP request is forwarded to any server-side scripts.

11. The web server of claim 10, the operations further comprising:

sending an HTTP response to the client device instructing a browser of the client device to make a new HTTP request to a uniform resource locator (URL) corresponding to a mobile version of the resource requested by the client.

12. The web server of claim 10, the operations further comprising:

modifying the HTTP request received from the client device to include header information indicating that client is a mobile device; and forwarding the modified HTTP request to server-side scripts associated with servicing the requested resource.

13. The web server of claim 10, the operations further comprising:

modifying the HTTP request received from the client device to include header information describing one or more capabilities of the client device; and forwarding the modified HTTP request to server-side scripts associated with servicing the requested resource.

14. A computer-implemented method of detecting mobile devices, the method comprising:

sending, by a web server, a domain name service (DNS) request for one or more mobile device detection strings;

sending, by a DNS server, a DNS response to the web server in response to the DNS request, the DNS response including one or more mobile device detection strings, wherein the mobile device detection strings are regular expression strings;

storing, at the web server, the mobile device detection strings included in the DNS response in memory;

receiving, at the web server, a hyper text transfer protocol (HTTP) request from a client device for a resource specified, at least in part, by a domain name; and determining, at the web server, before initiating any associated script to process the HTTP request, whether the client device is a mobile device by comparing a characteristic of the client device to one or more of the mobile device detection strings sent by the DNS server, wherein determining whether the client device is a mobile device comprises:

comparing a User-Agent header in the HTTP request to one or more of the mobile device detection strings;

determining that the client device is a mobile device if the User-Agent header matches one or more of the mobile device detection strings; and executing one or more modules in a web server application processing the HTTP request to determine whether the client is a mobile device before the HTTP request is forwarded to any server-side scripts.

15. The method of claim 14, further comprising:

sending, by the DNS server, a DNS text record including one or more updated mobile device detection strings; and storing, at the web server, the updated mobile device detection strings included in the DNS text record in memory.

* * * * *